United States Patent
Aiba

(10) Patent No.: US 11,330,120 B2
(45) Date of Patent: May 10, 2022

(54) DISPLAY CONTROL APPARATUS, CONTROL METHOD FOR DISPLAY CONTROL APPARATUS, AND NON-TRANSITORY COMPUTER-READABLE MEDIUM

(71) Applicant: CANON KABUSHIKI KAISHA, Tokyo (JP)

(72) Inventor: Toshitaka Aiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/140,164

(22) Filed: Jan. 4, 2021

(65) Prior Publication Data

US 2021/0127023 A1  Apr. 29, 2021

Related U.S. Application Data

(63) Continuation of application No. 16/527,351, filed on Jul. 31, 2019, now Pat. No. 10,911,621.

(30) Foreign Application Priority Data

Aug. 7, 2018 (JP) .............................. JP2018-148289

(51) Int. Cl.
*H04N 1/00* (2006.01)
*H04N 5/235* (2006.01)
(Continued)

(52) U.S. Cl.
CPC ......... *H04N 1/00461* (2013.01); *G06F 16/54* (2019.01); *G06T 5/50* (2013.01); *H04N 5/2351* (2013.01); *H04N 5/2355* (2013.01)

(58) Field of Classification Search
CPC ............. H04N 1/00461; H04N 5/2351; H04N 5/2355; H04N 2201/3274;
(Continued)

(56) References Cited

U.S. PATENT DOCUMENTS 9,324,164 B2 * 4/2016 Kikuchi ................. H04N 19/46
2014/0354845 A1 * 12/2014 Molgaard ............ H04N 5/2621
348/222.1
(Continued)

FOREIGN PATENT DOCUMENTS

JP  2014-204175 A  10/2014

OTHER PUBLICATIONS

Apple, "Photos Help", 2017, https://help.apple.com/photos/mac/1.2/?lang=en#/ (Year: 2017), pp. 1-11.

*Primary Examiner* — Lin Ye
*Assistant Examiner* — Chriss S Yoder, III
(74) *Attorney, Agent, or Firm* — Venable LLP

(57) ABSTRACT

A display control apparatus includes: a determination unit configured to determine whether each of a plurality of images is an image having a high dynamic range (HDR) or an image having a standard dynamic range (SDR); and a control unit configured to display a list of the plurality of images in a display unit and display an image selected from the list of the plurality of images in the display unit, wherein the control unit is further configured: to display a selected image in the plurality of images using the HDR, in a case where the image having the HDR is selected, and to display the plurality of images in the list uniformly using the HDR or the SDR, in a case where the plurality of images in the list includes both the image having the HDR and the image having the SDR.

18 Claims, 9 Drawing Sheets

(51) Int. Cl.
*G06F 16/54* (2019.01)
*G06T 5/50* (2006.01)
(58) Field of Classification Search
CPC .............. H04N 2201/3277; G09G 5/10; G09G 2320/0271; G09G 2320/0613; G09G 2340/0428; G09G 2360/16; G06F 3/1407; G06F 16/50–583; G06T 5/50
See application file for complete search history.

(56) References Cited

U.S. PATENT DOCUMENTS

2017/0134642 A1* 5/2017 Yoshikawa ........ H04N 5/23216
2018/0330674 A1* 11/2018 Baar ...................... H05B 45/20
2019/0058855 A1 2/2019 Uchimura et al.

\* cited by examiner

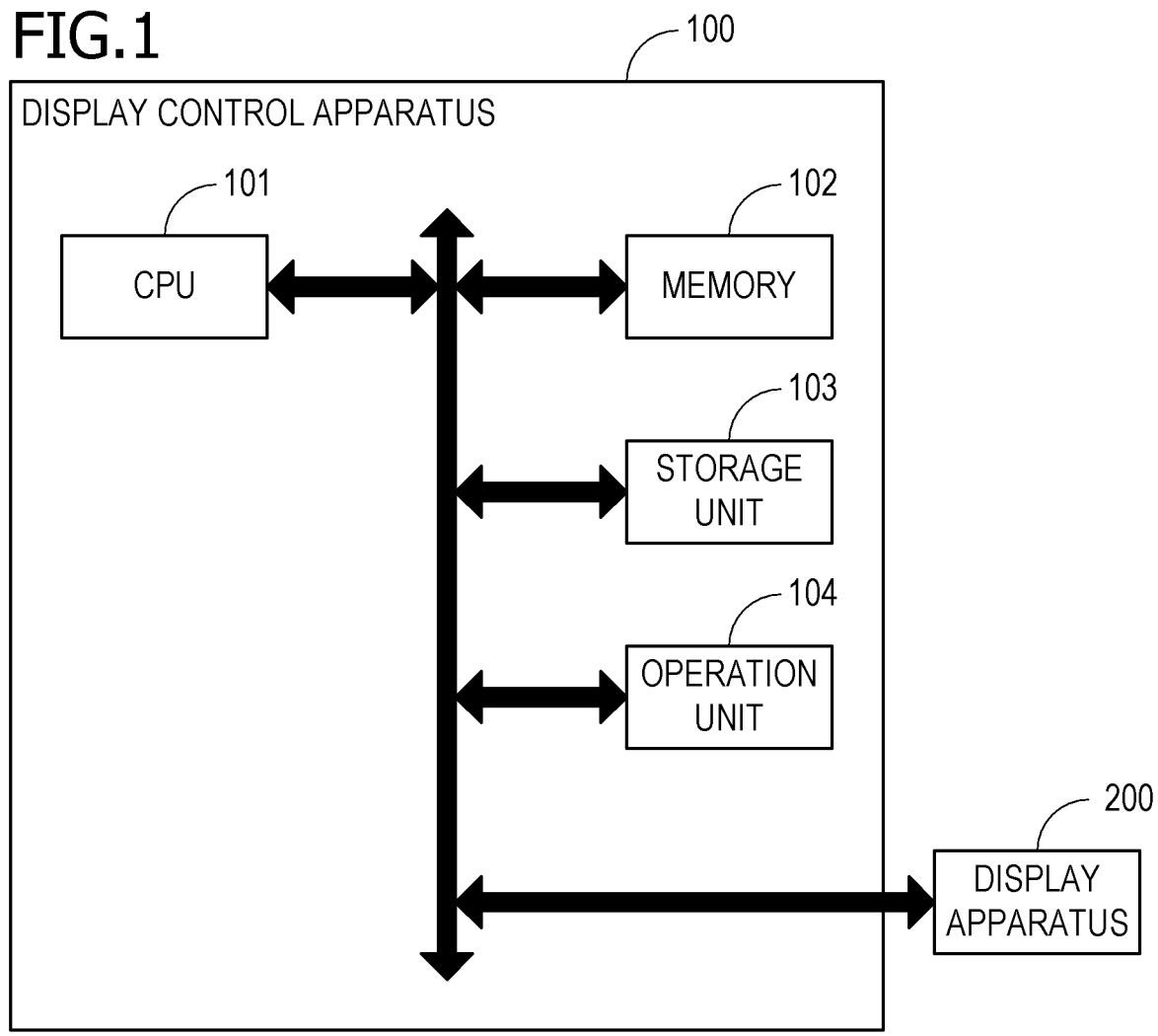

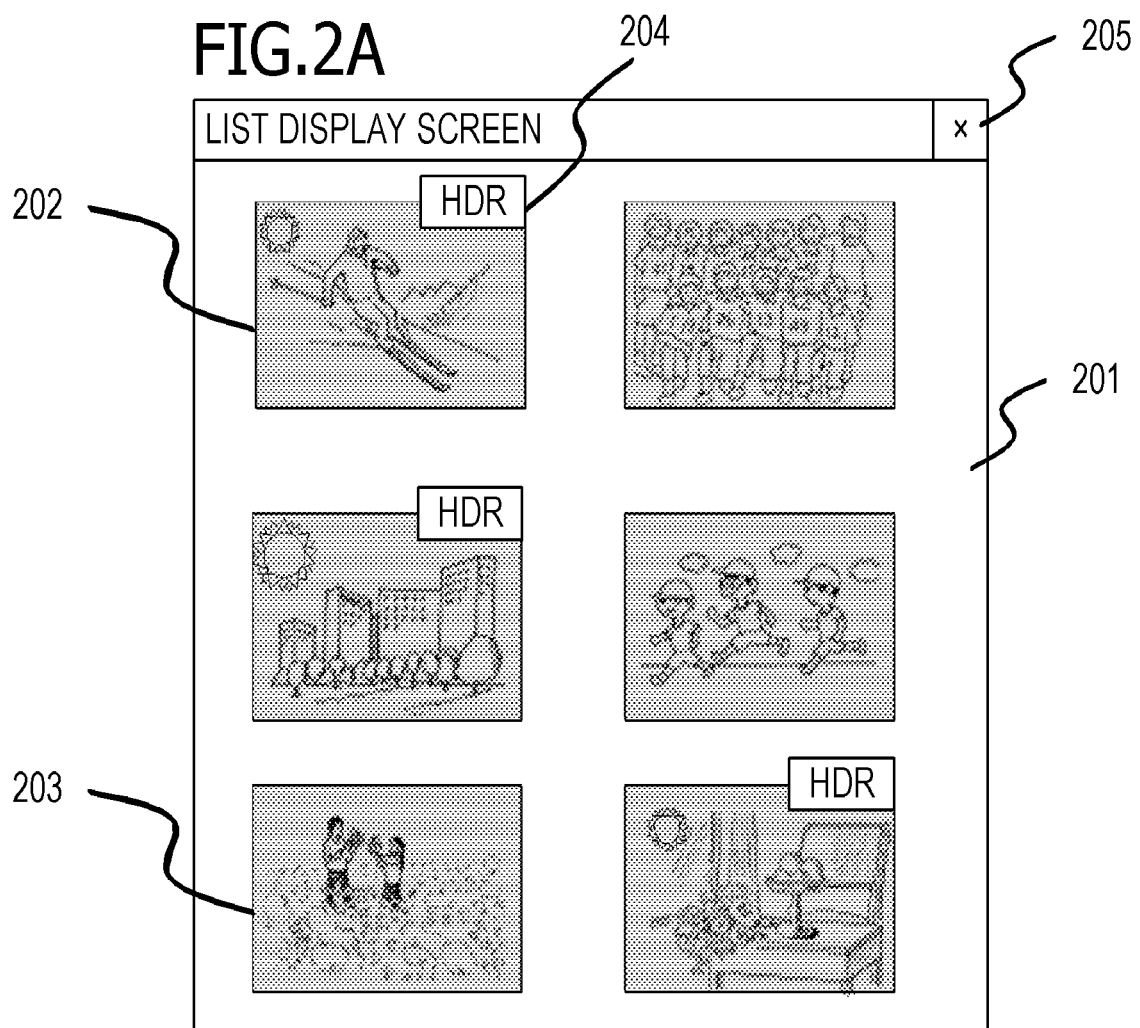

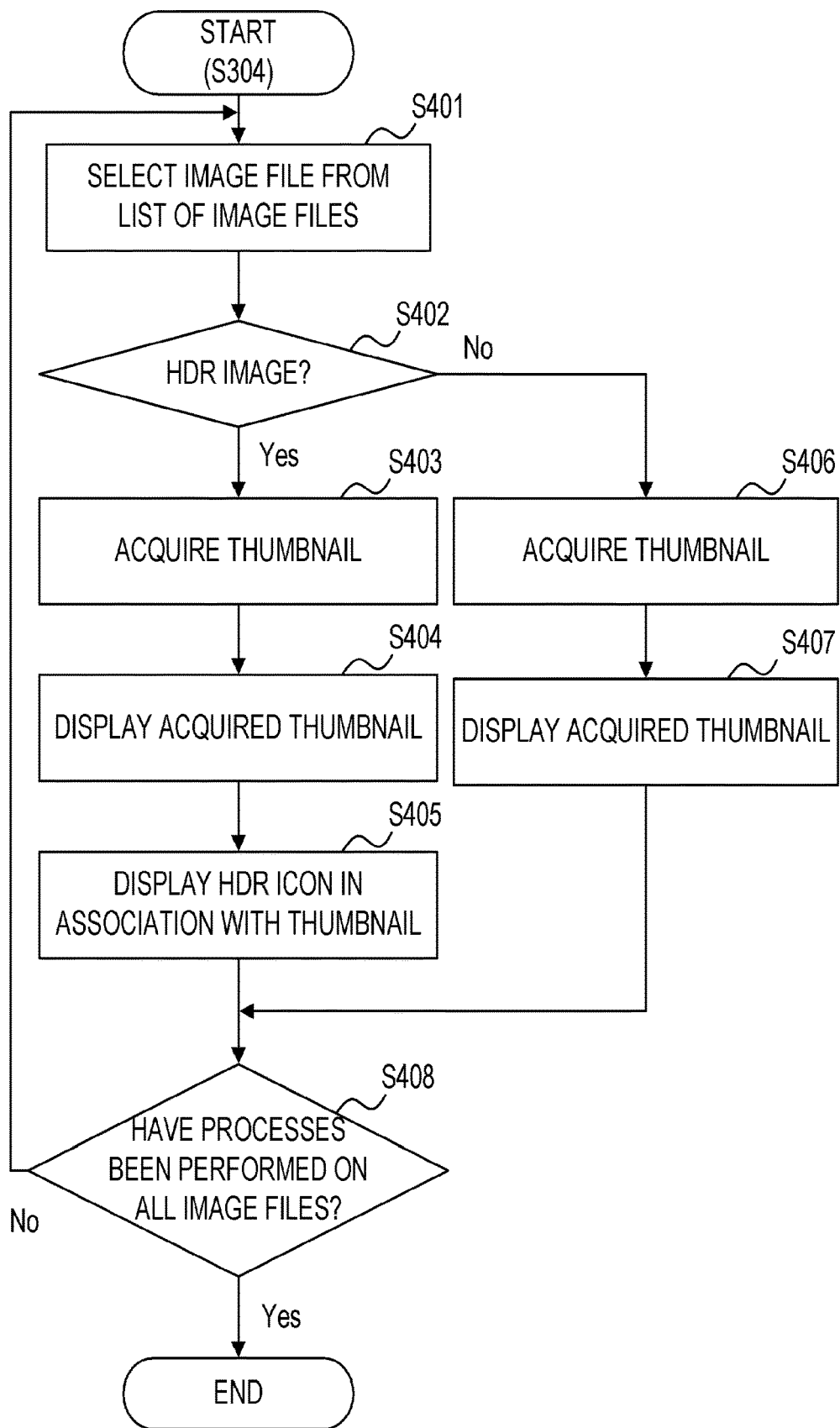

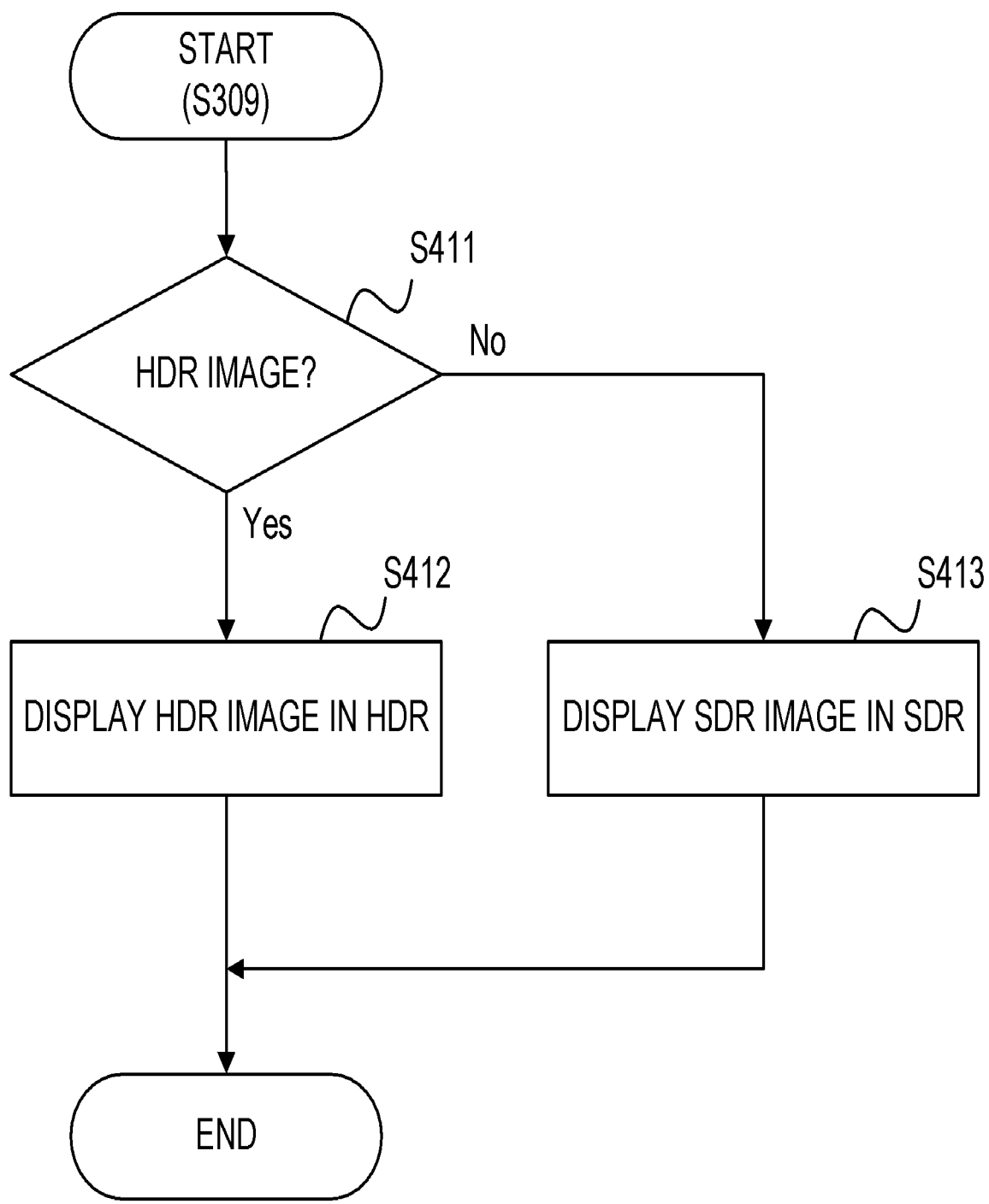

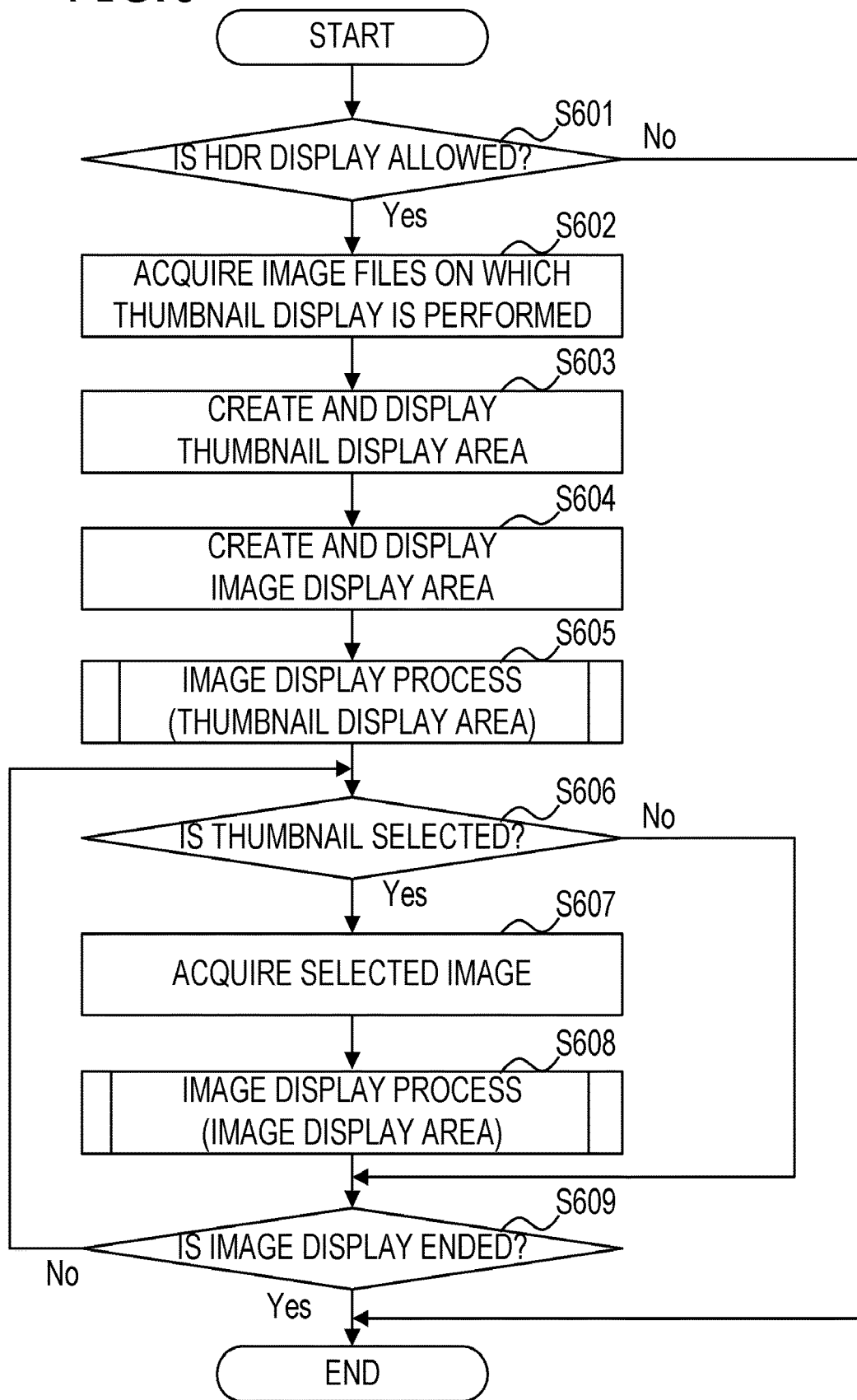

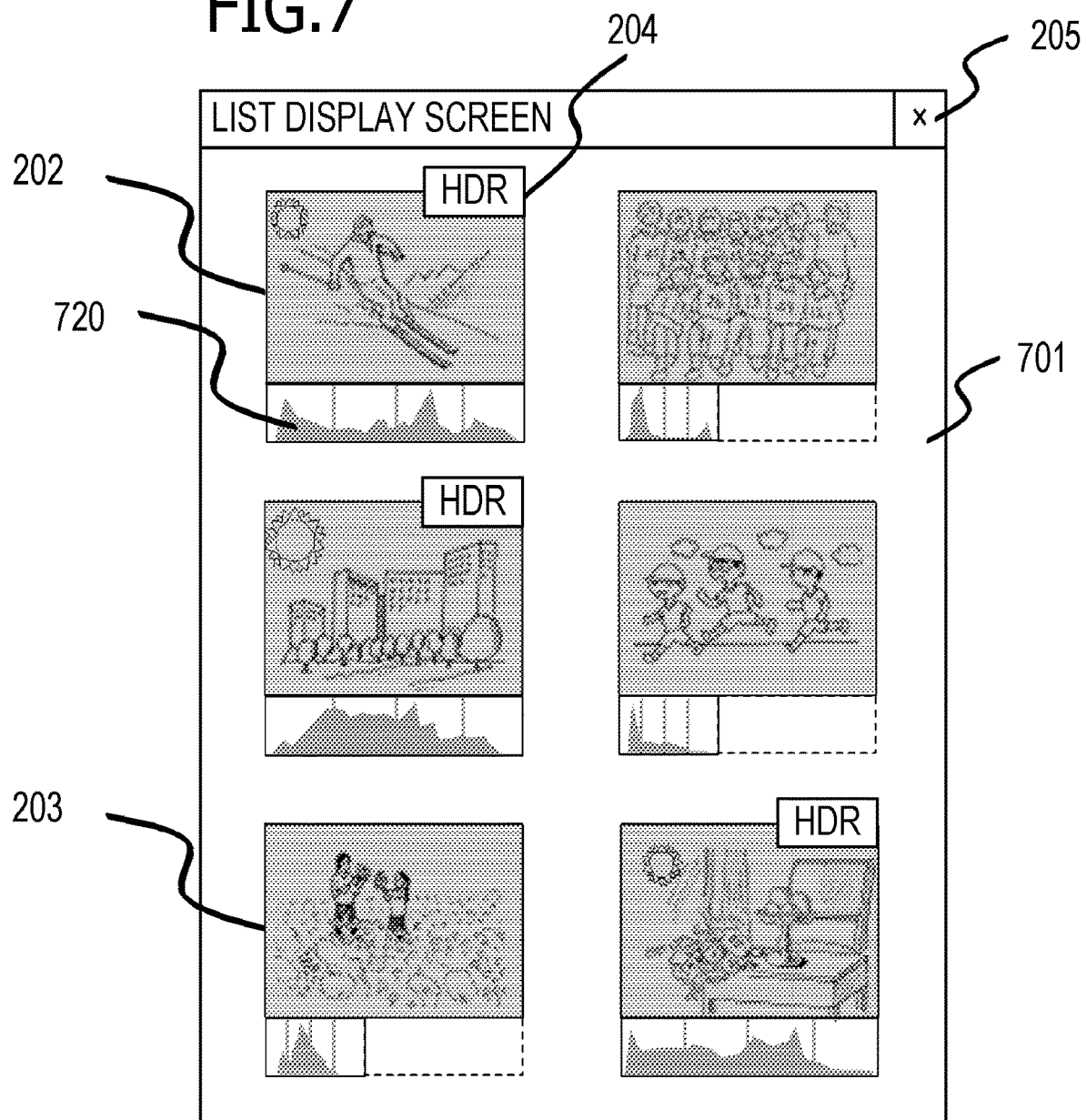

DISPLAY CONTROL APPARATUS, CONTROL METHOD FOR DISPLAY CONTROL APPARATUS, AND NON-TRANSITORY COMPUTER-READABLE MEDIUM

This application is a continuation of application Ser. No. 16/527,351 filed Jul. 31, 2019.

BACKGROUND OF THE INVENTION

Field of the Invention

The present invention relates to a display control apparatus, a control method for the display control apparatus, and a non-transitory computer-readable medium.

Description of the Related Art

The number of imaging apparatuses capable of shooting using a dynamic range (HDR: High Dynamic Range) wider than a conventional dynamic range (SDR: Standard Dynamic Range), and the number of display apparatuses capable of display using the HDR are increasing.

In general, in the case where HDR content or SDR content is displayed in a display apparatus capable of HDR display (display that uses the HDR), the HDR content is displayed using the HDR, and the SDR content is displayed using the SDR. That is, the content is displayed using the dynamic range corresponding to the content.

Japanese Patent Application Publication No. 2014-204175 proposes a technique for determining whether or not each image file is compatible with the HDR when a list of SDR images is displayed.

SUMMARY OF THE INVENTION

However, the technique proposed in Japanese Patent Application Publication No. 2014-204175 is based on the case where the SDR images (SDR content) are arranged and displayed in list form in a display apparatus capable of only SDR display, and does not consider the case where an SDR image and an HDR image are arranged and displayed in list form. In display of a list of images in the display apparatus capable of the HDR display, in the case where the SDR image and the HDR image are mixed and arranged, images having significantly different dynamic ranges are arranged, and there are cases where viewability is reduced.

To cope with this, an object of the present invention is to provide a technique that allows display of a list of a plurality of images having different dynamic ranges with high viewability.

The present invention in its first aspect provides a display control apparatus includes:

a determination unit configured to determine whether each of a plurality of images is an image having a high dynamic range (HDR) or an image having a standard dynamic range (SDR); and a control unit configured to display a list of the plurality of images in a display unit and display an image selected from the list of the plurality of images in the display unit,
  wherein the control unit is further configured:
    to display a selected image in the plurality of images using the HDR, in a case where the image having the HDR is selected, and
    to display the plurality of images in the list uniformly using the HDR or the SDR, in a case where the plurality of images in the list includes both the image having the HDR and the image having the SDR.

The present invention in its second aspect provides a control method for a display control apparatus, the control method includes:

determining whether each of a plurality of images is an image having a high dynamic range (HDR) or an image having a standard dynamic range (SDR);

displaying a list of the plurality of images in a display unit;

displaying an image selected from the list of the plurality of images in the display unit;

displaying the image using the HDR, in a case where the image having the HDR is selected; and displaying the plurality of images in the list uniformly using the HDR or the SDR, in a case where the plurality of images in the list includes both the image having the HDR and the image having the SDR.

The present invention in its third aspect provides a non-transitory computer readable medium that stores a program, wherein the program causes a computer to execute the above method.

According to the present invention, it is possible to display a list of a plurality of images having different dynamic ranges with high viewability.

Further features of the present invention will become apparent from the following description of exemplary embodiments with reference to the attached drawings.

BRIEF DESCRIPTION OF THE DRAWINGS

FIG. 1 is a hardware block diagram showing an example of the schematic configuration of a display control apparatus according to the present embodiment;

FIGS. 2A and 2B are views showing an example of image display according to a first embodiment;

FIGS. 4A and 4B are flowcharts showing examples of an image display process according to the first embodiment;

FIG. 6 is a flowchart showing an example of an image display process according to the second embodiment; and FIG. 7 is a view showing an example of image display according to a third embodiment.

DESCRIPTION OF THE EMBODIMENTS

First Embodiment

<Overall Configuration>

Figure 2B:
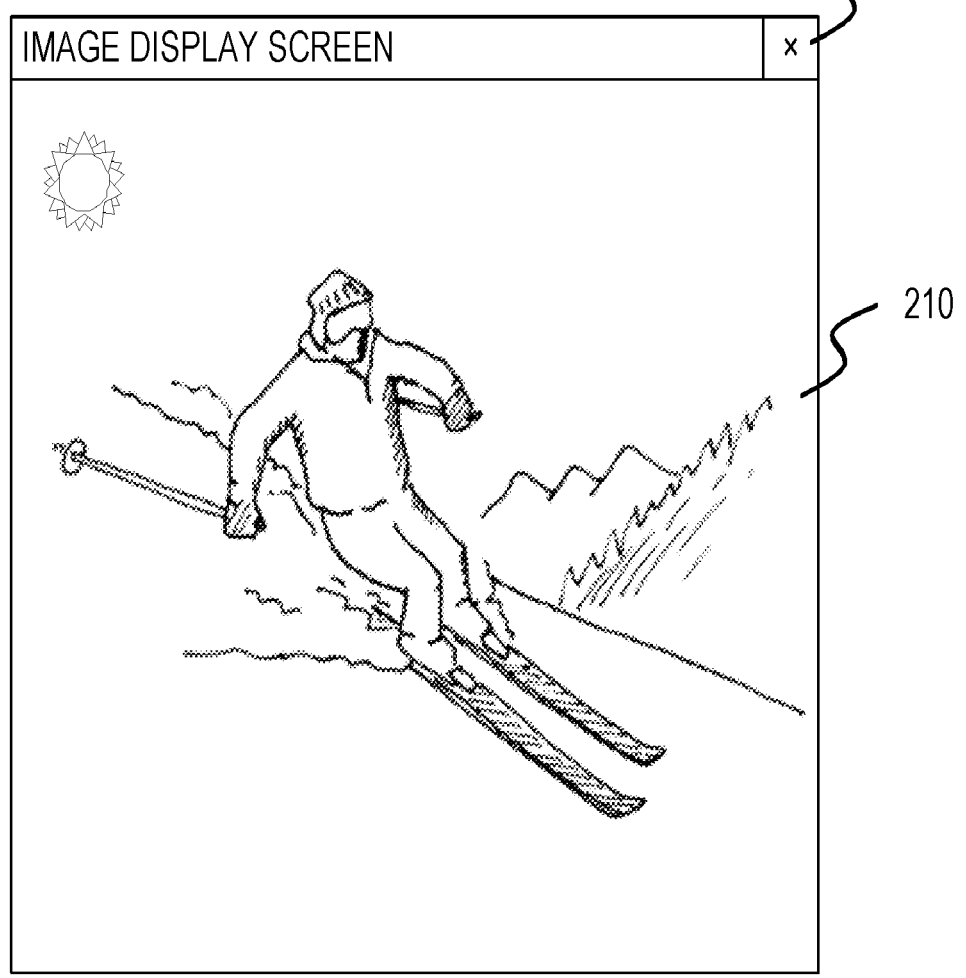

Hereinbelow, embodiments of the present invention will be described in detail based on the accompanying drawings. FIG. 1 is a hardware block diagram showing an example of the schematic configuration of a display control apparatus 100 according to the present embodiment. The display control apparatus 100 is a personal computer or the like. The display control apparatus 100 has a CPU 101, a memory 102, a storage unit 103, and an operation unit 104, and is connected to a display apparatus 200. The display apparatus 200 is a CRT or an LCD, and displays various screens and images such as, e.g., a graphical user interface (GUI) screen for assisting user operations (operations from a user) on a display surface. The display control apparatus 100 controls the display of the display apparatus 200. Note that the display control apparatus 100 and the display apparatus 200 may be integrated with each other.

The CPU 101 performs various processes and control operations of the display control apparatus 100. For example, the CPU 101 loads a predetermined program recorded in the storage unit 103 into the memory 102 and executes the program, and outputs commands (control signals) for controlling operations of the individual units of the display control apparatus 100 to the individual units. The individual units of the display control apparatus 100 perform predetermined operations corresponding to the commands from the CPU 101.

The memory 102 stores various data and information. For example, a RAM is used as the memory 102, and the memory 102 is used as a work memory of the CPU 101.

The storage unit 103 stores various data and information. For example, a hard disk or a ROM is used as the storage unit 103, and the storage unit 103 stores image data, image editing information for image editing, and the like. Note that the storage unit 103 may or may not be detachable from the display control apparatus 100.

The operation unit 104 receives user operations performed on the display control apparatus 100. For example, as the operation unit 104, a keyboard or a pointing device is used. Examples of the pointing device include a mouse, a trackball, and a touch panel. Note that the operation unit 104 may or may not be detachable from the display control apparatus 100.

<Outline>

To the display control apparatus 100 according to the present embodiment, the display apparatus 200 capable of display by using a high dynamic range (HDR) that is a dynamic range wider than a usual dynamic range is connected. The display control apparatus 100 according to the present embodiment operates based on a setting that displays an HDR image using the HDR (HDR display mode). Note that, in the case where the display apparatus 200 without support for HDR display (display that uses the HDR) or the case where the display control apparatus 100 is not in the HDR display mode, the HDR image is displayed using a standard dynamic range (SDR) that is a conventional dynamic range.

In the present embodiment, a plurality of image files are retained in a predetermined folder. When predetermined software (application) is activated, the image files retained in the predetermined folder are read, and a list of thumbnails of images is displayed. Herein, the thumbnail denotes a reduced image used when a list of images is displayed. In addition, in the present embodiment, an SDR image file and an HDR image file are mixed and retained in the predetermined folder.

In general, in the case where the thumbnail is displayed in the display apparatus 200 with support for the HDR display, the thumbnail is displayed using the dynamic range corresponding to the image to be displayed. That is, the thumbnail of an SDR image is displayed using the SDR, and the thumbnail of the HDR image is displayed using the HDR. Accordingly, as in the present embodiment, in the case where the image files having different dynamic ranges are mixed, in display of a list of images, the thumbnail of the HDR image that can reproduce high brightness and the thumbnail of the SDR image having a conventional brightness range are mixed, which results in a decrease in viewability.

To cope with this, in the present embodiment, in order to lessen the reduction in viewability, the thumbnail of the HDR image is displayed using the SDR in the list display in the case where the thumbnail of the HDR image and the thumbnail of the SDR image are mixed. The SDR thumbnail to be displayed may be obtained by performing conversion from the HDR image, or the SDR thumbnail that is created in advance may also be read and displayed instead of using the thumbnail obtained by the conversion. Note that the thumbnail of the SDR image is displayed using the SDR. Thus, by displaying all of the thumbnails using the SDR, the dynamic ranges of the images in the list display are unified into the conventional SDR, and hence viewability of the entire list display image is improved. On the other hand, in the case where an image other than the images in the list display is displayed (in the case where an image corresponding to the thumbnail selected from the list is displayed for appreciation), the HDR image is displayed using the HDR and the SDR image is displayed using the SDR because appreciation is the purpose of the display. Note that it is only required that the thumbnails are displayed using the same dynamic range in order to improve the viewability of the list display, and all of the thumbnails may be displayed using, e.g., the HDR instead of the SDR.

<Display Screen>

Each of FIGS. 2A and 2B shows a display screen in the present embodiment. FIG. 2A is a screen (window) on which a list of images (thumbnails) is displayed, and is a screen for selecting an image to be appreciated. FIG. 2B is a screen having one image that is displayed on the full screen, and is a screen for appreciating the displayed image. When one thumbnail is selected from the screen in FIG. 2A by a user, the screen in FIG. 2B is displayed such that the image corresponding to the selected thumbnail is displayed on the entire screen. In the present embodiment, a description will be given of an example in which the screen is switched from the screen in FIG. 2A to the screen in FIG. 2B and the screen in FIG. 2B is displayed in response to the selection of the thumbnail, but the screen in FIG. 2B may also be displayed as another screen (another window) different from the screen shown in FIG. 2A side by side with the screen shown in FIG. 2A.

In FIG. 2A, a thumbnail display area 201 is an area (display area) for displaying a list of the thumbnails of the image files in the predetermined folder. A thumbnail 202 is a thumbnail that corresponds to the HDR image and is displayed using the SDR. A thumbnail 203 is a thumbnail that corresponds to the SDR image and is displayed using the SDR. In an example in FIG. 2A, the thumbnail 202 and the thumbnail 203 are mixed and displayed. In the present embodiment, the dynamic range of each thumbnail is not the dynamic range corresponding to the image but the SDR. A method for acquiring the SDR thumbnail from the HDR image will be described later. An icon 204 is an icon (HDR icon) that indicates that the image corresponding to the thumbnail having the icon 204 is the HDR image. When all of the thumbnails are displayed using the SDR, the thumbnail of the HDR image and the thumbnail of the SDR image cannot be distinguished from each other. Consequently, by displaying the icon 204, the user is notified that the image corresponding to the thumbnail having the icon 204 is the HDR image. A button 205 is a button for closing the screen of the list display (disabling the list display). The button 205 can also be viewed as a button for ending software of the present embodiment.

In FIG. 2B, an image display area 210 is an area for displaying an image for image appreciation on which a full-screen display of the image (single image display) is performed. In the present embodiment, in the case where the image is displayed in the image display area 210, the image is displayed using the dynamic range corresponding to the image. That is, the HDR image is displayed using the HDR, and the SDR image is displayed using the SDR. In an example in FIG. 2B, the image corresponding to the thumbnail 202 is displayed using the HDR. A button 211 is a button for closing a screen of a full-screen display of the image (disabling the full-screen display of the image). In the present embodiment, when the button 211 is pressed down, the screen of the full-screen display shown in FIG. 2B is closed, and a list display screen shown in FIG. 2A is displayed.

<Process Detail>

Figure 3:
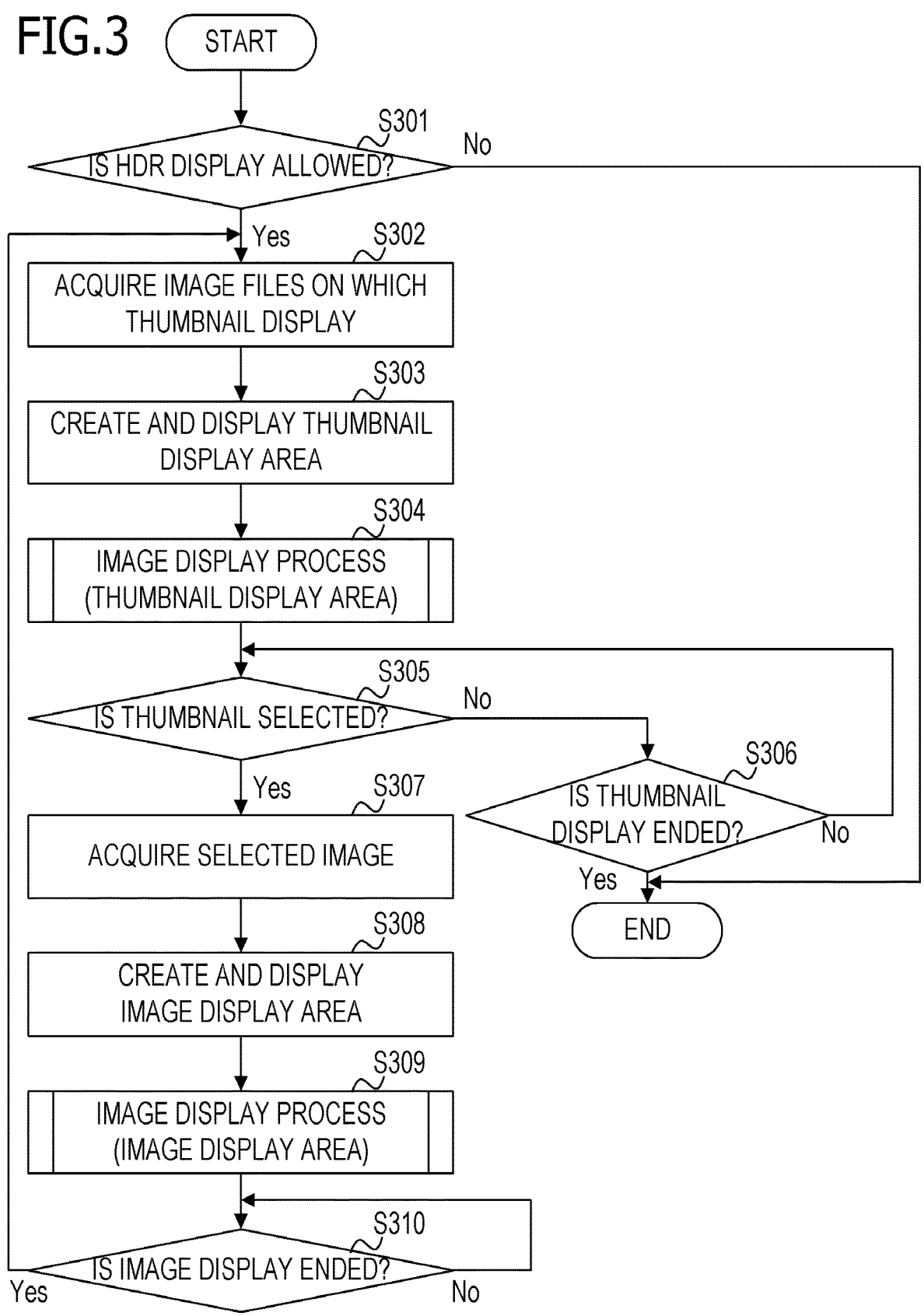
FIG. 3 is a flowchart showing an example of an image display process according to the first embodiment.

Each of FIG. 3 and FIGS. 4A and 4B shows a flowchart of an image display process performed in the display control apparatus 100 in the present embodiment. The CPU 101 loads a program stored in a non-volatile memory (not shown) into the memory 102 and executes the program, and the present process is thereby implemented.

In the present embodiment, all of the thumbnails displayed in the thumbnail display area 201 are displayed using the SDR. That is, the thumbnail of the HDR image is displayed using the SDR, and the thumbnail of the SDR image is displayed using the SDR. In addition, on the image display area 210, the HDR image is displayed using the HDR, and the SDR image is displayed using the SDR.

The user operates the operation unit 104 to activate the above predetermined software, and the image display process shown in FIG. 3 is thereby started.

In Step S301, the CPU 101 determines whether or not the display setting of the display control apparatus 100 is in a mode that allows the HDR display (an HDR display mode, a setting in which the HDR image is displayed using the HDR). The flow proceeds to Step S302 in the case where the display setting is in the mode that allows the HDR display, and the present process is ended in the case where the display setting is not in the mode that allows the HDR display. Note that, in the case where the display setting is not in the mode that allows the HDR display, every image is displayed using the conventional SDR, and hence the description thereof will be omitted. Note that the user may operate the operation unit 104 to activate the above predetermined software, and the above-mentioned image display process may be thereby started in a state in which the screen display setting of the display control apparatus 100 is set to the HDR display mode. In this case, the above-described process in Step S301 is not performed.

In the present embodiment, the above-described determination is performed by acquiring information indicative of whether or not the display setting of the display control apparatus 100 is in the mode that allows the HDR display from an OS or the like that operates on the display control apparatus 100. Note that, in the case where an image is rendered by a method in which the image is rendered directly in a video card without support by the OS, the above-described determination may be performed by acquiring information indicative of whether or not a monitor connected to the video card is the display apparatus 200 that can reproduce the HDR.

In Step S302, the CPU 101 acquires a plurality of image files retained in a predetermined folder in the storage unit 103.

In Step S303, the CPU 101 creates and displays the screen (FIG. 2A) that displays a list of thumbnails. The individual thumbnails 202 and 203 are sequentially displayed by a process described later.

In Step S304, the CPU 101 acquires the thumbnails from the plurality of image files, and displays the thumbnails on the thumbnail display area 201. Herein, in an image display process in Step S304 according to the present embodiment, The CPU 101 displays the thumbnail of the SDR image using the SDR, and displays the thumbnail of the HDR image using the SDR instead of the HDR. The details of the present process will be described later.

In Step S305, the CPU 101 determines whether or not the thumbnail has been selected from the list of the thumbnails by the operation performed on the operation unit 104 by the user. The flow proceeds to Step S307 in the case where the thumbnail has been selected, and the flow proceeds to Step S306 in the case where the thumbnail has not been selected.

In Step S306, the CPU 101 determines whether or not a command for ending the display of a list of the thumbnails has been issued. For example, in the case where the button 205 is pressed, the CPU 101 determines that the command for ending the display of a list of the thumbnails has been issued. The list display screen is closed and the present process is ended in the case where the command for ending the display of a list of the thumbnails has been issued, and the flow proceeds to Step S305 in the case where the command for ending the display of a list of the thumbnails has not been issued.

In Step S307, the CPU 101 acquires the image corresponding to the thumbnail selected by the user operation in Step S305.

In Step S308, the CPU 101 creates the area for displaying one image. In the present embodiment, the screen is switched from the list display screen (FIG. 2A) to the screen (FIG. 2B) including one image that is displayed on the full screen.

In Step S309, the CPU 101 displays the image acquired in Step S307 using the corresponding dynamic range. That is, the CPU 101 displays the image using the HDR in the case where the image acquired in Step S307 is the HDR image, and displays the image using the SDR in the case where the image acquired in Step S307 is the SDR image. With this, it becomes possible for the user to appreciate the selected image using the corresponding dynamic range. For example, in the case where the thumbnail 202 shown in FIG. 2A is selected in Step S305, the image corresponding to the thumbnail 202 is displayed using the HDR on the image display area 210 (the area for appreciating the image). The details of the present process will be described later.

In Step S310, the CPU 101 determines whether or not a command for ending the image display has been issued. For example, in the case where the button 211 is pressed, the CPU 101 determines that the command for ending the image display has been issued. The screen having one image that is displayed on the full screen is closed and the flow proceeds to Step S302 in the case where the command for ending the image display has been issued, and the process in Step S310 is repeated in the case where the command for ending the image display has not been issued.

By performing the processes from Step S302 to Step S310 described above, the CPU 101 unifies the dynamic ranges of the thumbnails into the SDR on the list display screen, and displays the image using the dynamic range corresponding to the image on the screen on which the single image display is performed.

FIG. 4A is a flowchart showing an example of the image display process performed on the thumbnail display area 201 in Step S304 in FIG. 3.

In Step S401, the CPU 101 selects the image file from the plurality of image files acquired in Step S302.

In Step S402, the CPU 101 determines whether or not the image file selected in Step S401 is the image file corresponding to the HDR image. The flow proceeds to Step S403 in the case where the selected image file is the image file corresponding to the HDR image, and otherwise, the flow proceeds to Step S406. In the present embodiment, the case where the selected image file is the image file that does not correspond to the HDR image is the case where the selected image file is the image file corresponding to the SDR image.

In Step S403, the CPU 101 acquires the SDR thumbnail from the image file. In a process for acquiring the SDR thumbnail from the image file, the SDR thumbnail that is retained in the image file in advance may be acquired, and the SDR thumbnail may also be acquired (created) by performing conversion from the HDR image corresponding to the image file.

Herein, the type of the image file is not particularly limited, and it is possible to use, e.g., a raw image format (RAW) file, or a high efficiency image file format (HEIF) file. The RAW file is an image file that includes a RAW thumbnail image and a RAW image. The HEIF file is an image file that includes the HDR thumbnail and the HDR image.

In the case of the RAW file, the SDR thumbnail may be acquired by performing various SDR conversions on the HDR image obtained by developing the RAW image (HDR development). In addition, the SDR thumbnail may also be acquired by performing convention on an HDR thumbnail image obtained by performing the HDR development on the RAW thumbnail image. Further, an SDR thumbnail image obtained by developing the RAW thumbnail image (SDR development) may be acquired and used as the above SDR thumbnail. Note that the SDR thumbnail acquired by the above method may be stored in the RAW file, and the stored SDR thumbnail may be used when the thumbnail is displayed next.

In addition, in the case where the image file is the HEIF file, the SDR thumbnail may be acquired by performing various SDR conversions on the HDR thumbnail or the HDR image. Note that a conversion method for displaying the HDR image using the SDR is not particularly limited, and examples of the conversion method include a method (linear conversion method) in which each brightness is reduced by using the same coefficient, and a method in which the brightness is reduced by using a coefficient (weight) that differs from one brightness (brightness range) to another.

In Step S404, the CPU 101 displays the SDR thumbnail acquired in Step S403. In the example shown in FIG. 2A, the thumbnail 202 and the like are displayed in the thumbnail display area 201.

In Step S405, the CPU 101 displays the icon 204 for notifying the user that the image corresponding to the thumbnail displayed in Step S404 is the HDR image. In the present embodiment, the icon 204 with "HDR" is displayed on the thumbnail 202 on the thumbnail display area 201 to be superimposed on the upper part of the image. Note that the position, size, and shape of the icon, and presence or absence of letters are not particularly limited. In addition, the HDR image may be distinguished from the SDR image by another method other than the above method. For example, the frame of the thumbnail of the HDR image may be enhanced and displayed, and the thumbnail of the HDR image may be thereby distinguished from the thumbnail of the SDR image.

In Step S406, the CPU 101 acquires the SDR thumbnail from the image file (SDR image). As a method for acquiring the thumbnail from the SDR image, it is possible to use a common process.

In Step S407, the CPU 101 displays the thumbnail acquired in Step S406. In the example shown in FIG. 2A, the thumbnail 203 and the like are displayed in the thumbnail display area 201.

In Step S408, the CPU 101 determines whether or not the processes from Step S401 to Step S407 have been performed on all of the image files. The present process is ended in the case where the processes have been performed on all of the image files, and otherwise, the flow proceeds to Step S401. By repeating Steps S401 to S408, the thumbnail display of all of the image files is performed. The thumbnail of the HDR image is displayed using the SDR, and the thumbnail of the SDR image is displayed using the SDR by the above-described processes. As a result, the dynamic ranges of the thumbnails displayed in the thumbnail display area are unified into the SDR.

FIG. 4B is a flowchart showing an example of the image display process performed on the image display area in Step S309 in FIG. 3.

In Step S411, the CPU 101 determines whether or not the image acquired in Step S307 is the HDR image. The flow proceeds to Step S412 in the case where the image is the HDR image, and the flow proceeds to Step S413 in the case where the image is not the HDR image.

In Step S412, the CPU 101 displays the image acquired in Step S307 on the image display area 210 using the HDR. In the example in FIG. 2B, the image corresponding to the thumbnail 202 is displayed in the image display area 210 using the HDR.

In Step S413, the CPU 101 displays the image acquired in Step S307 on the image display area 210 using the SDR.

As described thus far, in the case where the image display process shown in FIG. 4A is called in Step S304, this is the case of the image display process performed on the thumbnail display area 201, and hence the thumbnail of the HDR image is displayed using the SDR, and the thumbnail of the SDR image is displayed using the SDR. In addition, in the case where the image display process shown in FIG. 4B is called in Step S309, this is the case of the image display process performed on the image display area 210 for image appreciation, and hence the HDR image is displayed using the HDR, and the SDR image is displayed using the SDR.

Note that the image display processes shown in FIG. 4A and FIG. 4B may be performed by using one process. In this case, in Step S304 and Step S309, the same image display process is called. Subsequently, the CPU 101 determines a caller of the image display process first. A method for determining the caller is not particularly limited, and the determination may be performed by determining whether or not the display area subjected to the image display process is the thumbnail display area 201. Herein, the case where the display area is the thumbnail display area 201 denotes the case where the image display process in Step S304 in FIG. 3 is performed. In addition, the case where the display area is not the thumbnail display area 201 denotes the case where the display area is the image display area 210 and the image display process in Step S309 in FIG. 3 is performed.

Advantageous Effect of Present Embodiment

With the processes described above, in the case where the software in the present embodiment performs the display of the list of the thumbnails in the display apparatus 200 capable of the HDR display, it is possible to secure viewability by displaying all of the thumbnails using the SDR. In addition, in the case where the image is displayed for appreciation, it is possible to display the image using the original dynamic range of the image by displaying the image using the dynamic range corresponding to the image (displaying the HDR image using the HDR, and displaying the SDR image using the SDR).

Second Embodiment

<Outline>

In the first embodiment described above, the description has been given of the example in which the thumbnail list display screen and the image display screen are different screens. In the present embodiment, a description will be given of an example in which a list of thumbnails and an image are displayed on one screen (window). The configurations of the display control apparatus 100 and the display apparatus 200 in the present embodiment are the same as those in the first embodiment described above, and hence the description thereof will be omitted.

<Display Screen>

Figure 5:
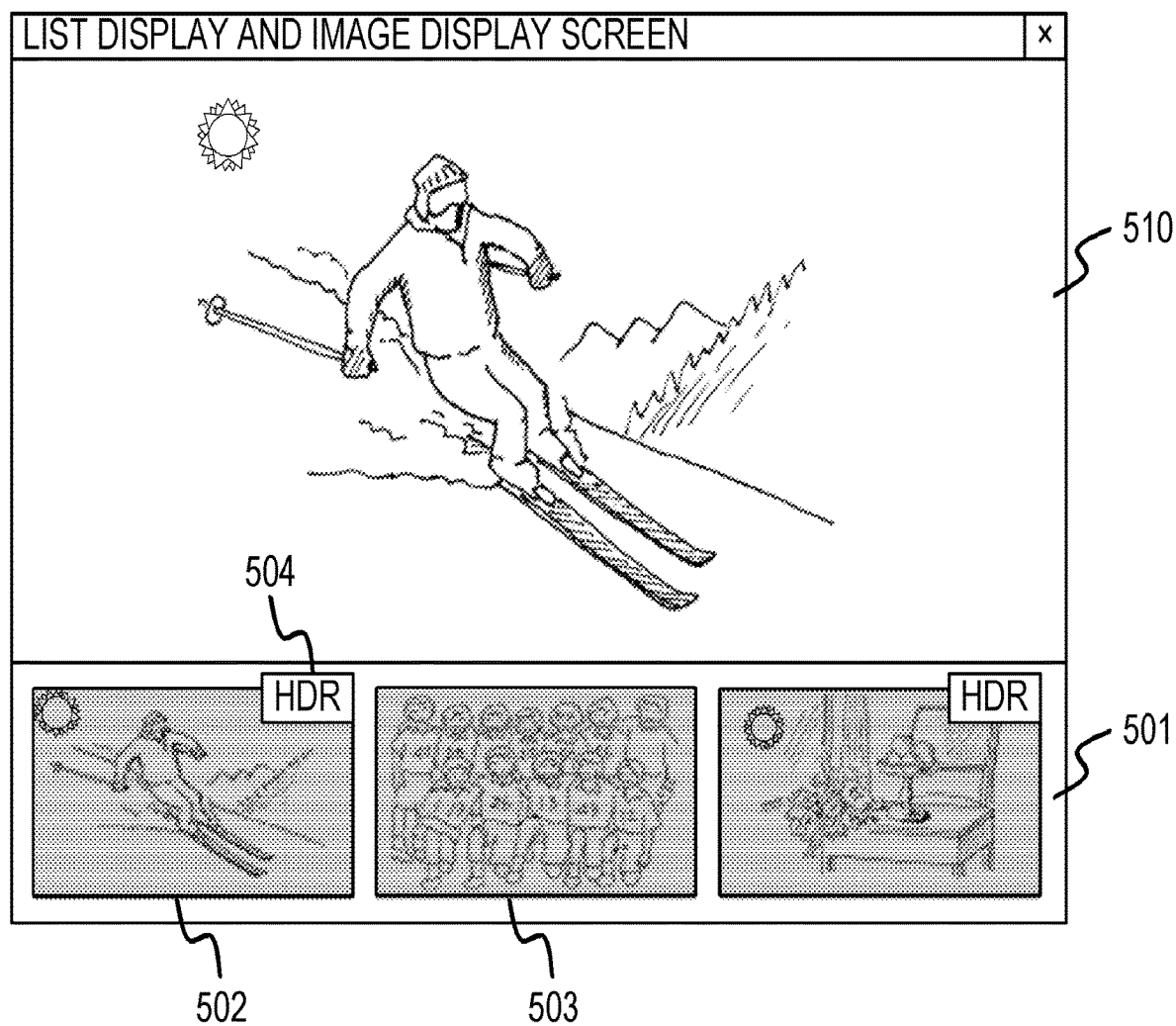
FIG. 5 is a view showing an example of image display according to a second embodiment.

FIG. 5 shows an image display screen according to the present embodiment. An image display area 510 is an area for displaying one image, and is a display area for image appreciation corresponding to the image display area 210 in FIG. 2B. The image display area 510 is the display area for performing the appreciation of the image, and hence the image is displayed using the dynamic range corresponding to the image. That is, the HDR image is displayed using the HDR, and the SDR image is displayed using the SDR.

A thumbnail display area 501 is an area for displaying a list of the thumbnails of the images in the above-described predetermined folder, and corresponds to the thumbnail display area 201 in FIG. 2A. In an example in FIG. 5, a thumbnail 502 that corresponds to the HDR image and is displayed using the SDR, and a thumbnail 503 that corresponds to the SDR image and is displayed using the SDR are mixed and both of the thumbnails are displayed.

The thumbnail 502 in FIG. 5 is the thumbnail of the HDR image that is displayed using the SDR, and corresponds to the thumbnail 202 in FIG. 2A.

The thumbnail 503 in FIG. 5 is the thumbnail of the SDR image that is displayed using the SDR, and corresponds to the thumbnail 203 in FIG. 2A. This is common thumbnail display.

An icon 504 in FIG. 5 is an icon that indicates that the image is the HDR image, and corresponds to the icon 204 in FIG. 2A. The HDR image is displayed using the SDR and cannot be distinguished from the SDR image from the image, and hence the icon 504 notifies the user that the image corresponding to the thumbnail 502 is the HDR image.

<Process Detail>

FIG. 6 is a flowchart of an image display process performed in the display control apparatus 100 in the present embodiment. The CPU 101 loads a program stored in a non-volatile memory (not shown) into the memory 102 and executes the program, and the present process is thereby implemented.

Processes in Steps S601 to S603 are the same as those in Steps S301 to S303 shown in FIG. 3, and hence the description thereof will be omitted.

In Step S604, the CPU 101 creates an area for displaying one image. In the present embodiment, the thumbnail display area 501 and the image display area 510 are provided on the same screen. When the thumbnail on the thumbnail display area 501 is selected by the user, the image of the image display area 510 is switched.

Processes in Steps S605 to S608 are the same as those in Steps S304, S305, S307, and S309 shown in FIG. 3, and hence the description thereof will be omitted.

In Step S609, the CPU 101 determines whether or not a command for ending the image display has been issued. The display screen is closed (the image display is disabled) and the present process is ended in the case where the command for ending the image display has been issued, and otherwise, the flow proceeds to Step S606.

In the present embodiment, by providing the thumbnail display area and the image display area on one screen, it is possible to change the image subjected to the image display (full-screen display) without closing the image display screen every time the image is changed, as in the first embodiment.

Note that, in the example of the screen display shown in FIG. 5, the image display area 510 for the single image display is disposed in the upper portion of the screen, and the thumbnail display area 501 is disposed in the lower portion of the screen. However, the arrangement of the display areas is not particularly limited. For example, the thumbnail display area 501 may be disposed above, on the left of, or on the right of the display area for the single image display.

Third Embodiment

<Outline>

In the first embodiment described above, the description has been given of the example in which only the thumbnail is displayed on the thumbnail list display screen. In the present embodiment, a description will be given of an example in which the thumbnail of the image and a histogram of each image are displayed on the thumbnail list display screen. The configurations of the display control apparatus 100 and the display apparatus 200 in the present embodiment are the same as those in the first embodiment described above, and hence the description thereof will be omitted.

<Display Screen>

FIG. 7 is the thumbnail list display screen according to the present embodiment. A thumbnail display area 701 is an area for displaying thumbnails of images and the histogram of each image. Similarly to FIG. 2A, the thumbnail 202 is the thumbnail of the image. A histogram 720 is a histogram corresponding to each image. In the present embodiment, a brightness histogram in which the horizontal axis indicates a value of brightness gradation (brightness value), and the vertical axis indicates the number of pixels corresponding to the value of brightness gradation is displayed.

In addition, in the present embodiment, the display control apparatus 100 controls the range of each histogram such that the range corresponds to the dynamic range of each image. That is, even in the case where the thumbnail of the HDR image is displayed using the SDR, the histogram is displayed using the range corresponding to the HDR. Further, the thumbnail is displayed using the SDR in the case of the SDR image, and the histogram is displayed using the range corresponding to the SDR.

With the foregoing configuration, even in the case where the HDR image and the SDR image serving as images displayed in list form are mixed, it is possible to check the histogram using the dynamic range corresponding to the image while securing the viewability of the thumbnail list display screen. In addition, for example, by checking the histogram, the user can determine whether or not the corresponding image has clipped whites or crushed shadows.

Note that, with regard to the histogram, it is only required that the distribution of pixel values can be recognized, and the histogram is not limited to the brightness histogram and may also be a color histogram. In addition, a waveform monitor in which the horizontal axis indicates an image signal and the vertical axis indicates a value of pixel gradation may be displayed. Further, in the case where the SDR image and the HDR image are mixed, the standards of the histograms may be unified. That is, the ranges of the horizontal axes of the histograms may be unified and the histograms may be displayed. Specifically, the maximum value of the horizontal axis in each histogram (the right end in an example in FIG. 7) may be used as the maximum brightness of the HDR. In addition, in the case where the SDR image and the HDR image are mixed, the maximum value of the dynamic range corresponding to each image may be used as the maximum value of the horizontal axis of the histogram. Further, in the case where the thumbnail of the HDR image is displayed using the SDR, the brightness histogram corresponding to the SDR may be displayed as the histogram. Note that, in addition to the image and the histogram, additional information of the image (a shooting date and time, the type of an imaging apparatus, and settings at the time of shooting) may be displayed in the thumbnail display area 701 for thumbnail display. Further, as in the second embodiment, in the case where the image display area and the thumbnail display area are displayed on one screen, the thumbnail and the histogram may be displayed in the thumbnail display area.

(Modification)

In each of the embodiments described above, the description has been given of the example in which, in the case where the HDR image and the SDR image are mixed on the thumbnail display area, the dynamic ranges of the thumbnails are unified into the SDR and the thumbnails are displayed. However, the dynamic ranges of the thumbnails may be unified into the HDR, and the thumbnails may be displayed. Further, it may be determined whether the dynamic ranges of the thumbnails are unified into the SDR or the HDR in accordance with the ratio between the number of the SDR images and the number of the HDR images.

In each of the embodiments described above, the size (display size) of the thumbnail has not been considered. However, it may be determined whether or not the dynamic ranges of the thumbnails are unified in accordance with the size of the thumbnail displayed on the thumbnail display area. For example, in the case where the size of the thumbnail (or the number of displayed thumbnails) can be changed by the user operation, only when the size thereof is smaller than a predetermined size, the dynamic ranges of the thumbnails displayed in the thumbnail display area may be unified.

In each of the embodiments described above, the description has been given of the example in which the SDR image file and the HDR image file are mixed in the predetermined folder. However, in the case where only the HDR image files are stored in the predetermined folder, all of the thumbnails are displayed using the SDR. To cope with this, the dynamic range of the image corresponding to the acquired image file may be acquired at the beginning of the image display process described above, and the process for unifying the dynamic ranges may be performed in the case where the images having different dynamic ranges are included.

In each of the embodiments described above, the description has been made by using, as the examples, the images having two types of the dynamic ranges that are the HDR image and the SDR image, but the type of the dynamic range is not particularly limited. For example, the HDR images having a plurality of dynamic ranges such as the HDR image having a maximum brightness of 1000 nits and the HDR image having a maximum brightness of 400 nits, and the SDR image may be used. Note that, in the case where the maximum brightness of the HDR image is different from the maximum displayable brightness of the display apparatus, the image is displayed in the above-described image display area using the maximum displayable brightness of the display apparatus instead of the dynamic range corresponding to the image.

The processes described above may be performed on software (application) that operates on the display control apparatus, but the processes may also be performed as the functions of the display control apparatus.

In each of the embodiments described above, the description has been given of the example in which the display apparatus separate from the display control apparatus is used, but the display control apparatus and the display apparatus may be mounted on the same electronic equipment.

Note that the various control operations described as the control operations performed by the CPU 101 may be performed by a piece of hardware, or a plurality of pieces of hardware (e.g., a plurality of processors or circuits) may share processes and thereby control the entire apparatus.

The present invention has been described in detail based on the preferred embodiments of the present invention. However, the present invention is not limited to the specific embodiments, and various embodiments without departing from the gist of the present invention are included in the present invention. Part of the embodiments described above may be appropriately combined. In addition, the present invention includes the case where a software program for implementing the functions of the embodiments described above is supplied directly from a recording medium or via wired/wireless communication to a system or apparatus having a computer capable of executing the program, and the supplied program is executed. The present invention is therefore implemented by program codes that are supplied to and installed in a computer in order to implement function processing of the present invention using the computer. That is, the present invention includes a computer program for implementing functional processing of the present invention. In this case, the present invention can take any program form such as an object code, a program executed by an interpreter, or a script data supplied to an OS as far as a program function is attained. As a recording medium for supplying the program, it is possible to use, e.g., a magnetic recording medium such as a hard disk or a magnetic tape, an optical/magneto-optical recording medium, and a non-volatile semiconductor memory. As a program supply method, it is conceivable to use a method in which a computer program that implements the present invention is stored in a server on a computer network, and the computer program is downloaded to a connected client computer and programmed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-148289, filed on Aug. 7, 2018, which is hereby incorporated by reference herein in its entirety.

What is claimed is:

1. An electronic apparatus comprising:
a display;
a storage for storing an image; and
a controller for controlling the display to display a thumbnail corresponding to the image,
wherein the storage stores a first image that is a SDR (Standard Dynamic Range) image and a second image that is a HDR (High Dynamic Range) image, and
wherein the controller:
(1) displays thumbnails including a first thumbnail corresponding to the first image and a second thumbnail corresponding to the second image on the display in a first dynamic range, and
(2) displays the second image on the display in a second dynamic range that is wider than the first dynamic range in a case where the second thumbnail is selected from the thumbnails.

2. The electronic apparatus according to claim 1, wherein the second image is included in an image file,
wherein the storage stores the image file, and
wherein the type of the image file is a HEIF (high efficiency image file format) file.

3. The electronic apparatus according to claim 2, wherein the image file includes the second thumbnail.

4. The electronic apparatus according to claim 1, wherein the second image is included in an image file,
wherein the storage stores the image file, and
wherein the type of the image file is a RAW (raw image format) file.

5. The electronic apparatus according to claim 4, wherein the second image is a RAW image.

6. The electronic apparatus according to claim 5, wherein the controller displays the second image on the display in the second dynamic range by developing the second image.

7. The electronic apparatus according to claim 5, wherein the image file includes a RAW thumbnail image.

8. The electronic apparatus according to claim 1, wherein the controller displays the second thumbnail and a histogram corresponding to the second image side-by-side on the display.

9. The electronic apparatus according to claim 8, wherein the histogram is a luminance histogram.

10. The electronic apparatus according to claim 8, wherein the histogram is a color histogram.

11. The electronic apparatus according to claim 1, wherein the controller displays an icon in the vicinity of the second thumbnail, and
wherein the icon notifies the user that the second image corresponding to the second thumbnail is an HDR (high dynamic range) image.

12. The electronic apparatus according to claim 11, wherein the icon includes the characters HDR.

13. The electronic apparatus according to claim 1, wherein the first dynamic range is the SDR (Standard Dynamic Range), and
wherein the second dynamic range is the HDR (High Dynamic Range).

14. The electronic apparatus according to claim 1, wherein the controller displays the first image on the display in the first dynamic range in a case where the first thumbnail is selected from the thumbnails.

15. The electronic apparatus according to claim 1, wherein the controller displays the thumbnails and the second image on one window.

16. The electronic apparatus according to claim 1, wherein the controller displays the thumbnails and the second image on different windows respectively.

17. A control method for controlling an electronic apparatus including a display and a storage for storing a first image and a second image, the control method comprising:
displaying a list including a first thumbnail corresponding to the first image and a second thumbnail corresponding to the second image on the display;
displaying the second thumbnail on the display in a first dynamic range narrower than a second dynamic range; and
displaying the second image on the display in the second dynamic range in a case where the second thumbnail is selected from the list.

18. A non-transitory computer-readable medium that stores a program, wherein the program causes a computer to execute a method for controlling an electronic apparatus including a display and a storage for storing a first image and a second image, the method comprising:
displaying a list including a first thumbnail corresponding to the first image and a second thumbnail corresponding to the second image on the display;
displaying the second thumbnail on the display in a first dynamic range narrower than a second dynamic range; and
displaying the second image on the display in the second dynamic range in a case where the second thumbnail is selected from the list.

* * * * *